(12) United States Patent
Hamilton

(10) Patent No.: US 9,360,016 B2
(45) Date of Patent: Jun. 7, 2016

(54) BODY COOLING SYSTEM

(71) Applicant: Rodney L. Hamilton, Gainesville, GA (US)

(72) Inventor: Rodney L. Hamilton, Gainesville, GA (US)

(*) Notice: Subject to any disclaimer, the term of this patent is extended or adjusted under 35 U.S.C. 154(b) by 630 days.

(21) Appl. No.: 13/692,126

(22) Filed: Dec. 3, 2012

(65) Prior Publication Data

US 2013/0142656 A1 Jun. 6, 2013

Related U.S. Application Data

(60) Provisional application No. 61/565,606, filed on Dec. 1, 2011.

(51) Int. Cl.
| | | |
|---|---|---|
| *F04D 15/00* | (2006.01) | |
| *F04D 25/08* | (2006.01) | |
| *F04D 27/00* | (2006.01) | |
| *A42B 3/28* | (2006.01) | |

(52) U.S. Cl.
CPC ............... *F04D 15/00* (2013.01); *A42B 3/286* (2013.01); *F04D 25/084* (2013.01); *F04D 27/004* (2013.01)

(58) Field of Classification Search
CPC .......... A42B 3/286; A42B 1/008; A42C 5/04; A41D 13/0025
See application file for complete search history.

(56) References Cited

U.S. PATENT DOCUMENTS

| | | | | |
|---|---|---|---|---|
| 3,548,415 | A | * | 12/1970 | Waters ........................... 2/171.3 |
| 5,085,231 | A | * | 2/1992 | Johnson ......................... 131/329 |
| 5,561,862 | A | | 10/1996 | Flores, Sr. |
| 5,592,936 | A | * | 1/1997 | Thomas et al. ........... 128/206.12 |
| 6,122,773 | A | | 9/2000 | Katz |
| 6,481,019 | B2 | * | 11/2002 | Diaz et al. ...................... 2/171.3 |
| D468,062 | S | | 12/2002 | Santiago |
| 6,760,925 | B1 | | 7/2004 | Maxwell |
| 7,143,451 | B2 | * | 12/2006 | Lundgren ....................... 2/171.3 |
| 7,802,318 | B2 | | 9/2010 | Chen |
| 7,921,473 | B1 | | 4/2011 | Winters |
| 2010/0017941 | A1 | * | 1/2010 | Taylor ............................ 2/171.3 |

* cited by examiner

*Primary Examiner* — Dwayne J White
*Assistant Examiner* — Julian Getachew
(74) *Attorney, Agent, or Firm* — Buckingham, Doolittle & Burroughs, LLC

(57) ABSTRACT

A system for cooling a user's body is provided. The body cooling system provides a rigid head covering, a ventilation component and an internal deflector component. The ventilation component may be integrated into or be removably attached to the rigid head covering. The internal deflector component directs air flow from the ventilation component along the user's body.

5 Claims, 5 Drawing Sheets

BODY COOLING SYSTEM

CROSS-REFERENCE

This application claims priority from Provisional Patent Application Ser. No. 61/565,606 filed Dec. 1, 2011.

FIELD OF THE INVENTION

This invention pertains generally to a head covering for cooling a user's body, and more particularly to a rigid head covering with a fan wherein an internal deflector redirects airflow down a user's body.

BACKGROUND

When spending time outdoors on a hot day or working in a high temperature environment, the high level of heat makes individuals requiring head protection to become uncomfortable to the point that they can no longer work or enjoy whatever activity in which they were engaged. This may cause the individual to become less productive and fall behind a planned work schedule or miss out on further recreational activity. High temperatures are not only physically taxing, but create a risk of heat related injury to those engaged in activities under these conditions.

Consequently, there is a need for head protection for use in high temperature environments that allows the user to stay cool. The proposed invention allows a user to circulate air across their body while still maintaining head protection. The air circulation allows the user to remain in the high temperature environment and continue their activity for longer periods of time while decreasing the likelihood of overheating. The apparatus pushes air and directs it down the user's neck and back while not interfering with movement. Furthermore, the invention is designed to be adaptable for use when increased ventilation is no longer desirable or necessary.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a body cooling system for increasing air flow across a user's body. The body cooling system comprises a rigid head covering, a rotary fan, an internal deflector component, and a controller component. Additionally, an external deflector component is attachable to the rigid head covering for redirecting air flow down a user's shoulders and back.

Furthermore, in a preferred embodiment of the invention, the rigid head covering is a helmet with an opening within a crown of the helmet. A ventilation component comprises a removable mounting plate with ventilation holes and a rotary fan for creating airflow within the helmet. Furthermore, an internal deflector component is suspendable within the helmet below the level of the rotary fan for directing the airflow along an interior surface of the helmet. An external deflector component is attachable to a rim of the helmet. The external deflector component redirects airflow across the user's neck and body to increase evaporation of sweat, thereby cooling the user under high temperature conditions. The body cooling system further comprises a cap plate for use when the helmet is used under conditions when the increased ventilation is no longer desirable such as indoors or in cool temperature environments. The ventilation component is removable from the helmet and is replaceable with the cap plate for covering the opening in the crown of the helmet.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
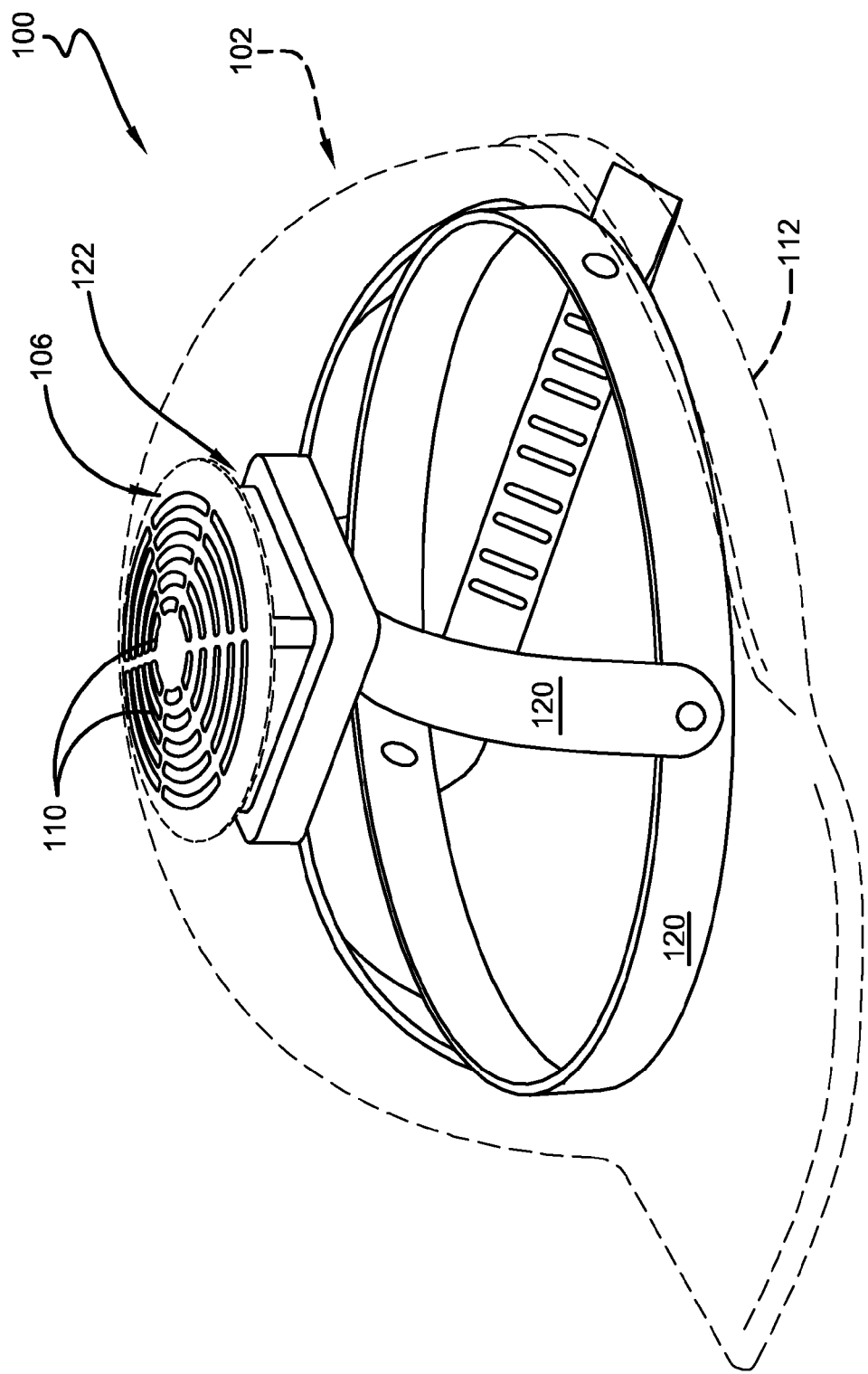
FIG. 1 illustrates a perspective view of a body cooling system in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Referring initially to the drawings, FIGS. 1-5 illustrate a body cooling system 100 for use by individuals engaged in activities where increased temperatures are a concern. The body cooling system 100 is useable as head protection by roofers, construction workers, landscapers, gardeners, painters, and the like, however, it may also be used by those individuals not requiring head protection such as sports spectators and individuals engaged in outdoor recreational activities who want to be more comfortable as well. The body cooling system 100 provides personal ventilation for those exposed to increased heat environments.

Figure 2:
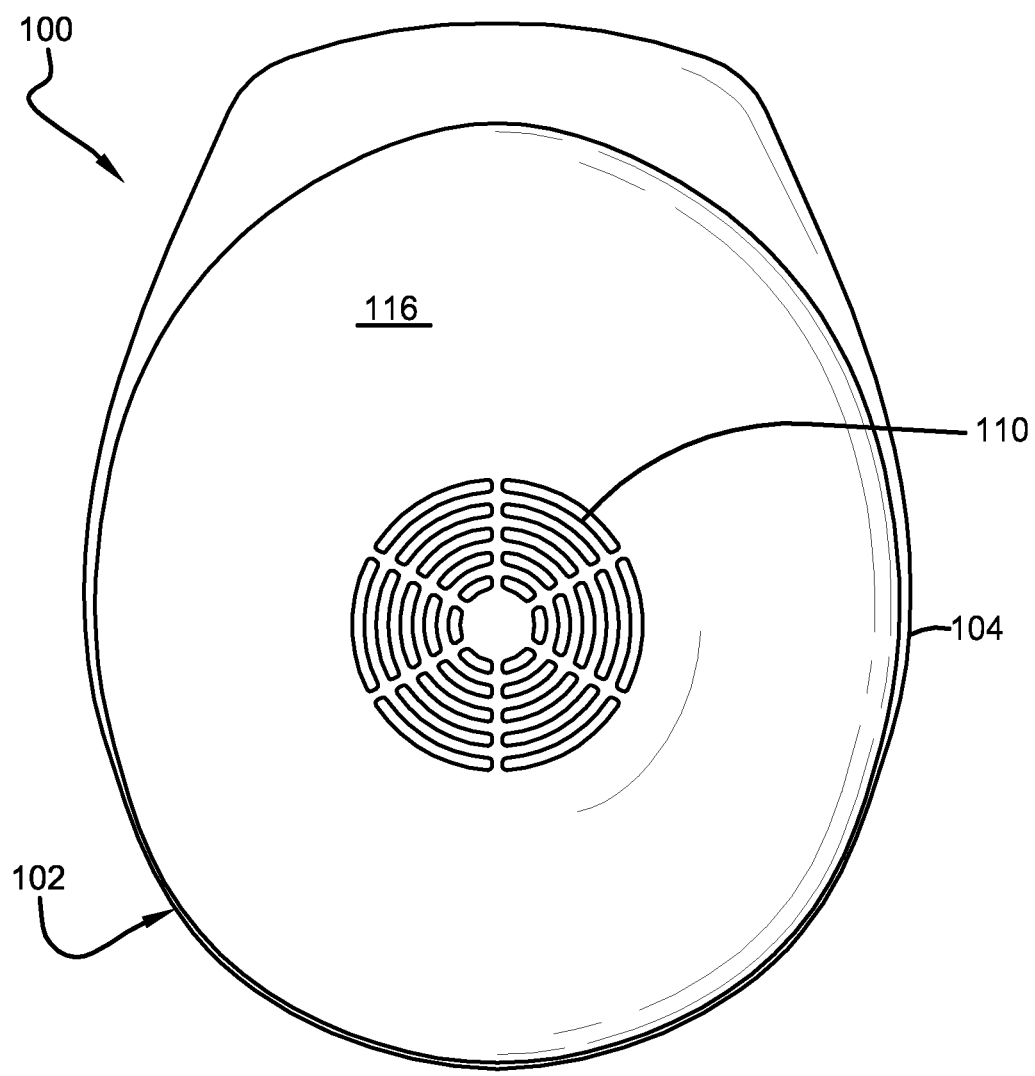
FIG. 2 illustrates a top view of the body cooling system in accordance with the disclosed architecture.

As illustrated in FIGS. 1 and 2, the body cooling system 100 comprises a rigid head covering 102, a ventilation component 122 and an internal deflector component 136. The rigid head covering 102 is typically a helmet such as a hard hat, but may also be any other rigid head wear as is known in the art, such as but not limited to a sports helmet, a novelty helmet and the like. The rigid head covering 102 comprises a shell 104 and a suspension element 120. The suspension element is typically nylon, cloth or plastic strapping or webbing for engaging with a user's head while allowing the shell 104 to be elevated above the user's head. The shell 104 comprises a crown 106, a rim 112, an interior portion 118 and an exterior portion 116. A plurality of ventilation holes 110 penetrate the crown 106 allowing air to pass through into an interior of the rigid head covering 102.

The ventilation component 122 comprises a rotary fan 130 mountable to the interior portion 118 of the shell 104. The rotary fan 130 comprises an electric motor 132 and a plurality of fan blades 134. While there are generally five fan blades 134 rotatably attached to the electric motor 132, any number of fan blades may be used. Similarly, while the rotary fan 130 is generally approximately between three and five inches in diameter, the only limitation on size is that the rotary fan 130 must fit within the interior of the rigid head covering 102 at a level above the internal deflector component 136. The electric motor 132 is preferably a 1½ volt motor, however, may be between an approximately ½ to 3 volt motor as well.

Figure 4:
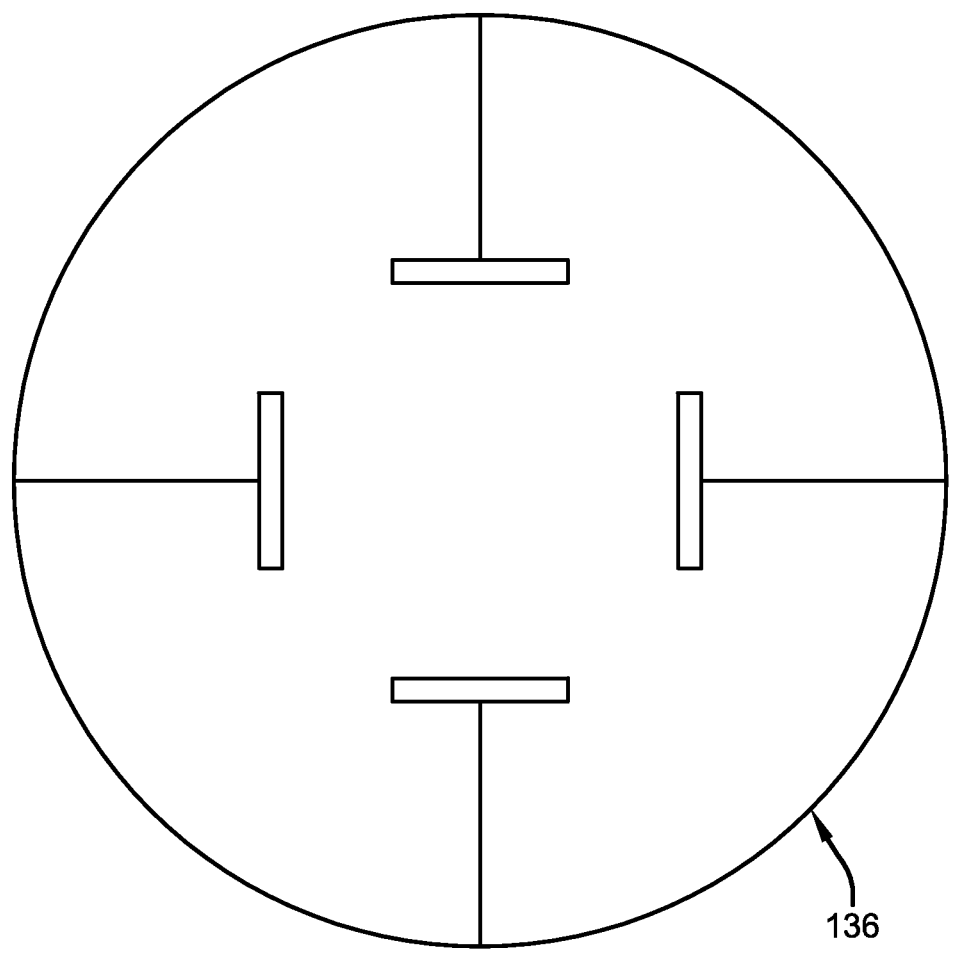
FIG. 4 illustrates a top view of an internal deflector component of the body cooling system in accordance with the disclosed architecture.

As illustrated in FIG. 4, the internal deflector component 136 is typically a flexible disc of plastic or other lightweight flexible material approximately between 4½ and 6 inches in diameter, however the dimensions may be larger or smaller as desired with the only limitation being that it must fit within the of the rigid head covering 102. For example, an internal deflector component 136 measuring 2½ inches in diameter would be usable for an embodiment of the body cooling system 100 sized to fit a small child. The internal deflector component 136 is attachable to the suspension element 120 so that it is located at a level below the rotary fan 130, but above the user's head. While the internal deflector element 136 is generally threaded onto the suspension element 120, this is not meant as a limitation as any method of attachment as is known in the art may be used, such as but not limited to mechanical fasteners, adhesives, and the like.

The internal deflector component 136 is generally concave in shape to correspond with the concavity of the rigid head covering 102. Furthermore, the internal deflector component 136 is adjustable in concavity thereby allowing the user to better direct airflow from the rotary fan 130 within the interior of the rigid head covering 102. The rotary fan 130 creates downward air flow within the rigid head covering 102 towards the user's head. The airflow cools the internal deflector component 136 thereby cooling the user's head. Additionally, the airflow is then directed along the convex side of the internal deflector component 136 so that it is redirected between internal deflector component 136 and the interior portion 118 of the rigid head covering 102. The air then flows below the rim 112 of the rigid head covering 102 and down onto the user's body. If the user desires greater cooling towards the back, the internal deflector component 136 may be adjusted so that there is greater airflow in that direction by creating a larger gap between internal deflector component 136 and the interior portion 118 at a back of the rigid head covering 102.

Figure 3:
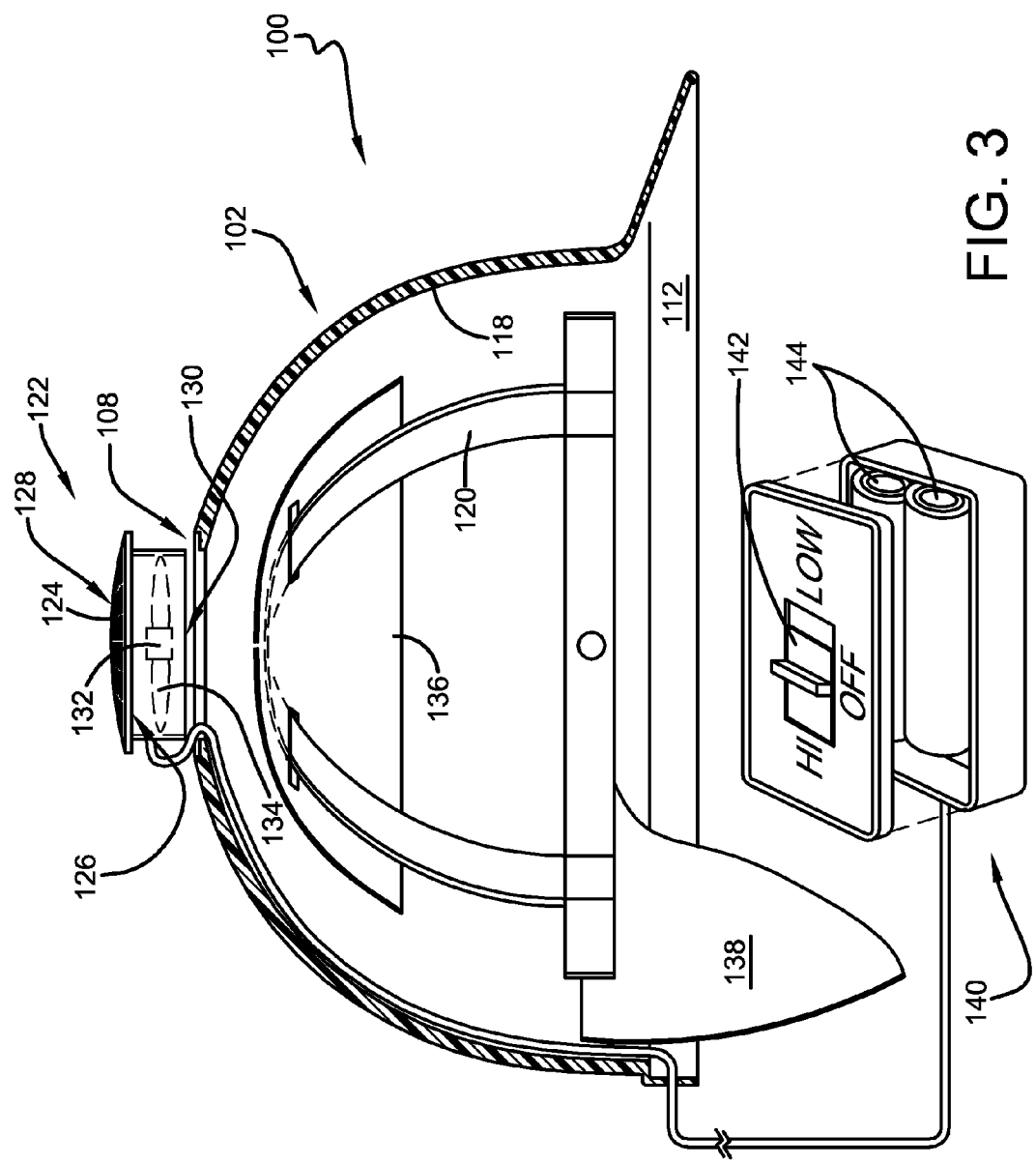
FIG. 3 illustrates a side view of the body cooling system in accordance with the disclosed architecture.

As illustrated in FIG. 3, the shell 104 may further comprise a crown opening 108. And, the ventilation component 122 may further comprise a mounting plate 124 comprising an inside portion 126 and an outside portion 128. The plurality of ventilation holes 110 are then located in the mounting plate 124. The mounting plate 124 is attachable to the shell 104 of the rigid head covering 102 so that it fills the crown opening 108. The mounting plate 124 is typically attachable to the shell 104 with screws, however this is not meant as a limitation as any mechanical or temporary attachment means as is known in the art may be used, such as but not limited to hook and loop fasteners, bolts, and the like. The rotary fan 130 is then attachable to the inside portion 126 of the mounting plate 124.

Figure 5:
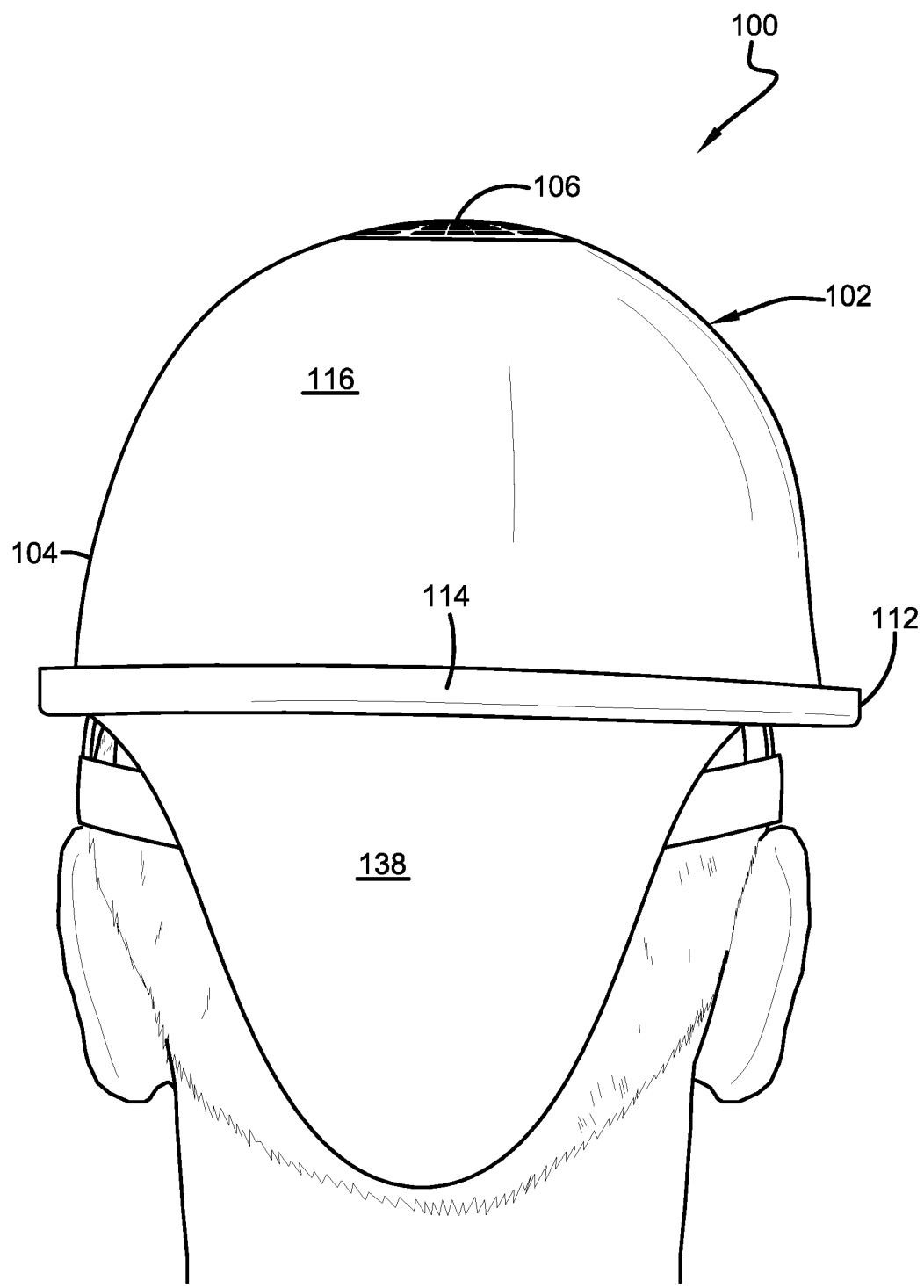
FIG. 5 illustrates a rear view of the body cooling system in accordance with the disclosed architecture.

As illustrated in FIG. 5, the body cooling system 100 may further comprise an external deflector component 138. The external deflector component 138 is typically a U-shaped or inverted bell shaped piece of flexible thin plastic or is manufactured from similar material as used for the internal deflector component 136 as discussed supra. However, the external deflector component 138 may comprise any shape desirable for deflecting airflow from the rotary fan 130 down the body of the user. Additionally, the external deflector component 138 is generally arcuate in configuration so that it is curved to correspond to the shape of the rim 112. The external deflector component 138 removably attaches to and extends below a rear portion of the rim 114 of the rigid head covering 102. Alternatively, the external deflector component 138 may be attachable to the suspension element 120.

As illustrated in FIG. 3, the body cooling system 100 further comprises a controller component 140 in electrical communication with the rotary fan 130. The controller component 140 comprises a switch 142 and a power source 144. The switch 142 is typically an on/off type switch capable of operating the rotary fan 130 at more than one speed, however a single speed switch may be used as well. The power source 144 may comprise a battery pack with alkaline or rechargeable batteries. However, this is not meant as a limitation as a solar cell or any other known traditional power source may be used as well.

The controller component 140 is connected to the rotary fan 130 with one or more wires. Generally the controller component 140 is located external to the rigid head covering 102. In a preferred embodiment, the controller component 140 is mountable on a belt or may be placed in a pocket. However, the controller component 140 may be alternatively mountable to the exterior portion 116 of the shell 104. Additionally, the controller component 140 may be either hardwired to or be detachable from the rotary fan 130.

The body cooling system 100 may further comprise a cap plate (not shown). The cap plate is mountable into the crown opening 108 as an alternative to the mounting plate 124. The cap plate is generally a solid piece of plastic without ventilation holes manufactured from a material similar to that used for the rigid head covering 102 and attaches in a similar manner as the mounting plate 124 as discussed supra. The cap plate is desirable for use in cooler weather when additional cooling is not required so that the rigid head covering 102 is still useable as head protection. The user simply unscrews the ventilation component 122, unplugs the controller component 140, and removes the entire ventilation component 122 from the crown opening 108. Then the user screws on the cap plate so that the crown opening 108 is covered.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A body cooling system comprising:
    a rigid head covering comprising a shell and a suspension element, wherein the shell comprises a crown, a rim, an interior portion, an exterior portion and a plurality of ventilation holes; and
    a rotary fan mountable to the interior portion of the shell; and
    an internal deflector component attached to the suspension element suspended below the rotary fan, wherein the internal deflector component is a flexible disc approximately between 4½ and six inches in diameter; and
    a controller component in electrical communication with the rotary fan.

2. The body cooling system of claim 1, wherein the plurality of ventilation holes are located within the crown of the shell.

3. The body cooling system of claim 1, wherein the flexible disc is concave in shape.

4. The body cooling system of claim 1, wherein the internal deflector component is adjustable.

5. The body cooling system of claim 1, further comprising an external deflector component attachable to the rim.

* * * * *